(12) United States Patent
Ray et al.

(10) Patent No.: US 9,805,196 B2
(45) Date of Patent: Oct. 31, 2017

(54) TRUSTED ENTITY BASED ANTI-CHEATING MECHANISM

(75) Inventors: Kenneth D. Ray, Seattle, WA (US); James M. Alkove, Woodinville, WA (US); Lonny Dean McMichael, Fall City, WA (US); Nathan T. Lewis, Monroe, WA (US); Patrik Schnell, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 685 days.

(21) Appl. No.: 12/394,430

(22) Filed: Feb. 27, 2009

(65) Prior Publication Data

US 2010/0223656 A1    Sep. 2, 2010

(51) Int. Cl.
*G06F 21/57* (2013.01)
*A63F 13/73* (2014.01)
(Continued)

(52) U.S. Cl.
CPC .............. *G06F 21/57* (2013.01); *A63F 13/73* (2014.09); *A63F 13/75* (2014.09); *G06F 21/51* (2013.01); *G06F 21/575* (2013.01); *G09C 1/00* (2013.01); *H04L 9/3234* (2013.01); *H04L 9/3239* (2013.01); *H04L 9/3271* (2013.01); *G06F 2221/2149* (2013.01)

(58) Field of Classification Search
CPC ...... G06F 21/86; G06F 21/602; G06F 21/123; G06F 21/50; G06F 21/57; G06F 2221/2153; H04L 9/3234; H04L 9/3239; H04L 9/3271; A63F 13/73; A63F 13/75

USPC .............................................. 726/3; 713/155
See application file for complete search history.

(56) References Cited

U.S. PATENT DOCUMENTS 7,103,779 B2    9/2006    Kiehtreiber
7,296,154 B2   11/2007    Evans
(Continued)

FOREIGN PATENT DOCUMENTS

CN      101154256 A    4/2008
EP       1679632 A2    7/2006
(Continued)

OTHER PUBLICATIONS

Shane Bafle, "final Fantasy—Securing On-Line Gaming with Trusted Computing", 2007, pp. 123-134, http://www.springerlink.com/content/95872526781183j0/.*
(Continued)

*Primary Examiner* — Jung Kim
*Assistant Examiner* — Carlos M De Jesus Lassala
(74) *Attorney, Agent, or Firm* — Baker & Hostetler LLP (57) ABSTRACT

An anti-cheating system may comprise a combination of a modified environment, such as a modified operating system, in conjunction with a trusted external entity to verify that the modified environment is running on a particular device. The modified environment may be may be modified in a particular manner to create a restricted environment as compared with an original environment which is replaced by the modified environment. The modifications to the modified environment may comprise alternations to the original environment to, for example, detect and/or prevent changes to the hardware and/or software intended to allow cheating or undesirable user behavior.

21 Claims, 10 Drawing Sheets

(51) Int. Cl.
*A63F 13/75* (2014.01)
*G09C 1/00* (2006.01)
*H04L 9/32* (2006.01)
*G06F 21/51* (2013.01)

(56) References Cited

U.S. PATENT DOCUMENTS

| | | | |
|---|---|---|---|
| 7,376,974 B2 | 5/2008 | Proudler | |
| 7,380,278 B2 | 5/2008 | Ellison | |
| 7,424,611 B2 | 9/2008 | Hino et al. | |
| 7,430,670 B1 | 9/2008 | Horning | |
| 7,530,103 B2 | 5/2009 | Willman et al. | |
| 8,433,923 B2 | 4/2013 | Yasaki et al. | |
| 8,484,735 B2 | 7/2013 | Yasaki et al. | |
| 2002/0198032 A1* | 12/2002 | Sitrick et al. | 463/1 |
| 2004/0078572 A1* | 4/2004 | Pearson et al. | 713/170 |
| 2004/0083366 A1 | 4/2004 | Nachenberg | |
| 2004/0088548 A1 | 5/2004 | Smetters et al. | |
| 2004/0103299 A1 | 5/2004 | Zimmer | |
| 2004/0123118 A1 | 6/2004 | Dahan et al. | |
| 2004/0242321 A1* | 12/2004 | Overton | 463/29 |
| 2005/0033980 A1* | 2/2005 | Willman et al. | 713/200 |
| 2005/0120219 A1 | 6/2005 | Munetoh | |
| 2005/0125548 A1 | 6/2005 | England | |
| 2005/0257251 A1 | 11/2005 | McKune | |
| 2006/0100010 A1* | 5/2006 | Gatto et al. | 463/29 |
| 2006/0224878 A1 | 10/2006 | Datta | |
| 2007/0106993 A1* | 5/2007 | Largman | G06F 9/5077 718/104 |
| 2007/0150937 A1 | 6/2007 | Gatto | |
| 2007/0198841 A1 | 8/2007 | Lundblade | |
| 2008/0077993 A1* | 3/2008 | Zimmer et al. | 726/27 |
| 2008/0159541 A1* | 7/2008 | Kumar et al. | 380/278 |
| 2008/0214309 A1 | 9/2008 | Gatto | |
| 2009/0070598 A1* | 3/2009 | Cromer | G06F 21/575 713/193 |
| 2009/0292919 A1* | 11/2009 | England | 713/168 |

FOREIGN PATENT DOCUMENTS

| | | |
|---|---|---|
| JP | 2003-271254 A | 9/2003 |
| JP | 2004-265286 A | 9/2004 |
| JP | 2005-056429 A | 3/2005 |
| JP | 2005-167589 A | 6/2005 |
| JP | 2006-323814 A | 11/2006 |
| JP | 2007-257197 A | 10/2007 |
| JP | 2008-71210 A | 3/2008 |
| JP | 2008-525892 A | 7/2008 |
| JP | 2008-217580 A | 9/2008 |
| JP | 2008-546122 A | 12/2008 |
| KR | 10-2004-0054493 A | 6/2004 |
| RU | 2161821 C2 | 1/2001 |
| WO | WO 2006/071630 A2 | 7/2006 |
| WO | WO 2007/002954 A2 | 1/2007 |

OTHER PUBLICATIONS

Shane Bafle, "Final Fantasy—Securing On-Line Gaming with Trusted Computing", 2007, pp. 123-134, http://www.springerlink.com/contentJ95872526781183j0/.*
Hewitt, B., "Trusted Computing and the Trusted Platform Module: What All the Fuss is About", Apr. 13, 2006, CS182JT, www.cs.hmc.edu, 11 pages.
Loureiro, S. et al., "Mobile Code Security", www.eurecom.fr, Downloaded from Internet Apr. 9, 2009, 9 pages.
Seshadri, A. et al., "Externally Verifiable Code Execution", Communications of the ACM, Sep. 2006, 49(9), 45-49.
Gallery, E., "Trusted Computing Technologies and Their Use in the Provision of High Assurance SDR Platforms", http://opentc.net, Downloaded from Internet Jan. 15, 200, 8 pages.
Zhang, L. et al., "Trusted Code Remote Execution through Trusted Computing and Virtualization", Eight ACIS International Conference on Software Engineering, 2007, IEEE, http://ieeexplore.ieee.org, 6 pages.
Smith, N., The Role of Integrity Management Infrastructure in Support of Proactive Security, Trusted Computing Group, 2006, 37 pages.
Bakr, O, et al., "TCPA and Palladium", Department of Electrical Engineering and Computer Science, Dec. 11, 2002, 46 pages.
Balfe, S. et al., "Final Fantasy-Securing On-Line Gaming with Trusted Computing", LNCS, 2007, 123-134.
A Trusted Open Platform, http://research.microsoft.com, Downloaded from Internet Oct. 23, 2008, 9 pages.
PCT Application No. PCT/US2010/021563 : International Search Report and Written Opinion of the International Searching Authority, Aug. 25, 2010, 8 pages.
Garfinkel T: "Terra: a virtual machine-based platform for trusted computing", Acm Sosp. Proceedings of The Acm Symposium on Operating Systemsprinciples; Oct. 19, 2003, pp. 193-206, XP002340992.
"Trusted Computing", Feb. 19, 2009 (Feb. 19, 2009), pp. 1-10, XP55030922, Retrieved from the Internet: URL:http//en.wikipedia.org/w/index.php? title=Trusted_Computing&oldid=271751 058 [retrieved on Jun. 25, 2012].
European Patent Application No. 10746590, Supplementary European Search Report dated Jul. 9, 2012, 7 pages.
Steve, "Working with Debian GPG Keys", Jan. 20, 2005, Retrieved from the Internet: URL:http://www.debian-administration.org/articles/82 [retrieved on Sep. 24, 2013].

\* cited by examiner

TRUSTED ENTITY BASED ANTI-CHEATING MECHANISM

BACKGROUND

Computer gaming has become a highly lucrative industry. Computer games have evolved from simple text based games to multimedia immersive environments including sophisticated animated graphics, music and sound. To augment the interactivity and social networking aspects of gaming, the online environment has become an integral part of the gaming experience allowing gaming enthusiasts to participate in multiplayer games, download new games, add new features to existing games they own, etc.

The online environment has also created new opportunities for gamers to engage in cheating. Cheating refers to any activity of a user such as software augmentation to gain unfair advantages over other players. In certain environments, such as multiplayer gaming, online cheating may become more important than offline cheating.

Cheating can take various different forms. The simplest includes modifying local data files, to obtain different specs for in-game assets (e.g. a much faster car) or to modify the in-game environment, to alter game achievements, to change the contents of or to load the saved games of other players. It can also take a physical form. On the Web are several specifications for creation and modification of a controller to enable faster than human actions, such as rapid fire.

These cheats can take the form of a simple software addition such as a filter driver or add-ons available for popular online multiplayer games. These may vary from, for example, heads-up displays, auto-mapping and guiding tools, auto-targeting, auto-spell casting, extensive macro capabilities, and creation of bots, which can run as automatons with the absence of direct user input. For example, in a game with walls, a user might find a "cheat" to make walls invisible or generate auto-targeting.

Cheating may also refer to a user's illicit garnering of achievements or awards in a game. Achievements may be accolades provided during game play and represent a badge of honor in game play. Achievements may be obtained offline or online and thus the cheating may occur in either mode. However, often achievements are reported online.

A user may engage in online cheating by, for example, augmenting or modifying an executable or data files on their system. Cheating not only refers to simple modifications to the input stack to enable rapid fire and changes to a race car, for example, but can also include complex add-ons seen for multiuser games including heads-up displays ("HUDs"), auto targeting, bots, etc.

Software cheating represents a significant economic threat to the viability of gaming software development. When online cheating runs rampant it stifles interest of users in gaming and thus negatively impacts both game sales as well as online subscription sales.

SUMMARY

An anti-cheating system may comprise a combination of a modified environment, such as a modified operating system, in conjunction with a trusted external entity to verify that the modified environment is running on a particular device. The modified environment may be modified in a particular manner to create a restricted environment as compared with an original environment which is replaced by the modified environment. The modifications to the modified environment may comprise alternations to the original environment to, for example, detect and/or prevent changes to the hardware and/or software to allow cheating or undesirable user behavior.

According to one embodiment, the anti-cheating system may be implemented via creation of a modified operating system, which includes anti-cheating restrictions, and the employment of a trusted platform module ("TPM") and associated static root of trust measurement ("SRTM"), which is used to validate that the modified operating system is running in an untampered form. The use of a TPM may be combined with other technologies to aid the efficiency of a security solution. A TPM may perform measurement up to a pre-determined point where the security of the remainder of the system may be inferred through another mechanism such as via a code integrity and/or disk integrity mechanism.

According to alternative embodiments, validation that the modified operating system is running in an untampered form may be implemented by any external trusted entity, so long as that entity has the ability to measure the modified operating system and has a way itself to be trusted. A trusted entity anti-cheating mechanism may be implemented by a secure hardware device such as a cell phone or in software by a hypervisor environment. Another alternative embodiment includes a system where the trusted entity validates a modified execution environment which runs a game on systems where an operating system does not exist, or validates a modified emulation environment inside an otherwise trusted operating system or hypervisor.

DETAILED DESCRIPTION OF ILLUSTRATIVE EMBODIMENTS

Figure 1A:
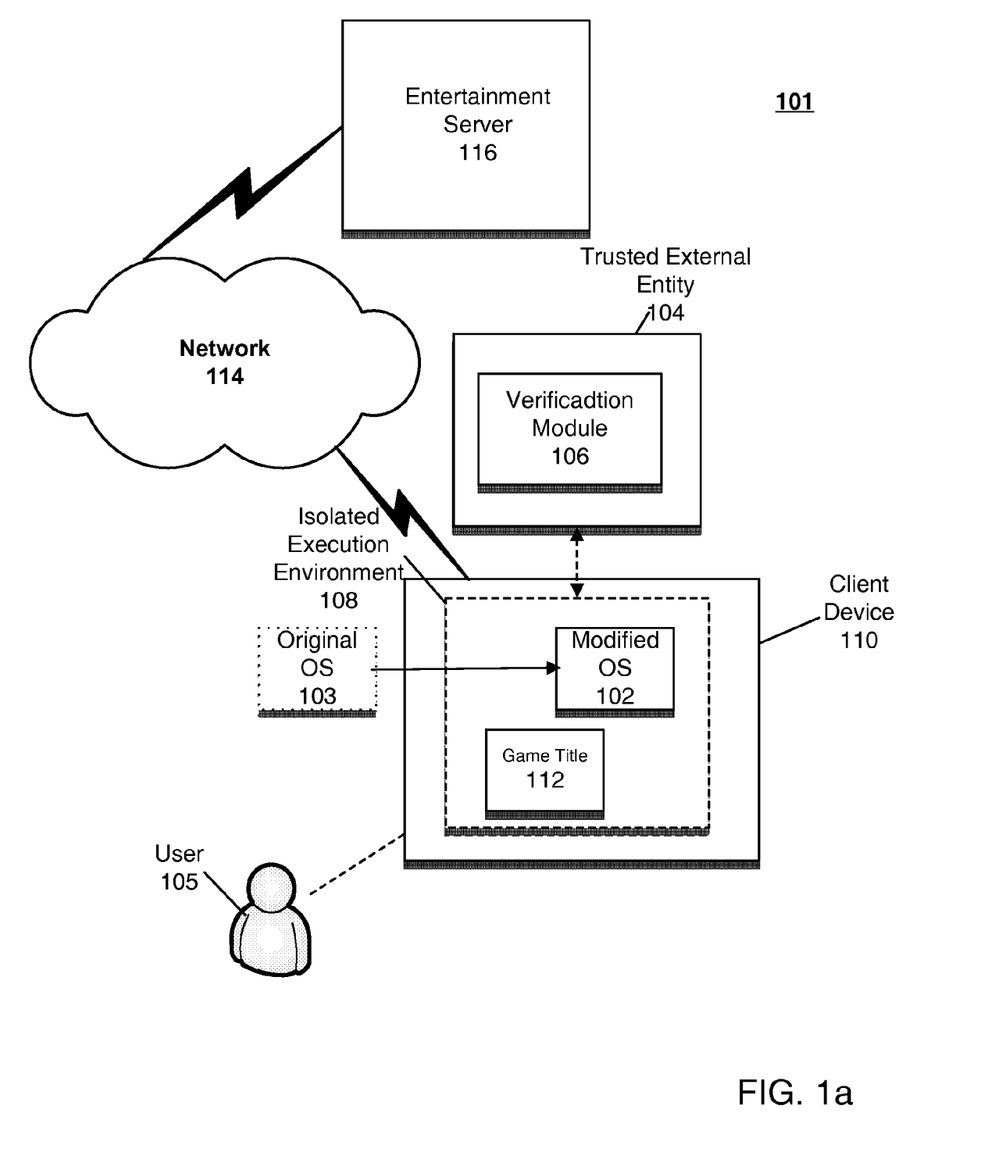
FIG. 1a depicts an anti-cheating system according to one embodiment.

FIG. 1a depicts an anti-cheating system according to one embodiment. According to one embodiment, anti-cheating system 101 may comprise a combination of an engineering of a modified environment, such as modified operating system 102 on client device 110 in conjunction with the operations of trusted external entity 104 to verify in fact that the modified environment, e.g., modified operating system 102 is in fact running on client device 110. The modified environment, e.g. modified operating system 102 may be modified in a particular manner to create a restricted environment as compared with original operating system 103, which it has replaced. According to one embodiment, the modifications in modified operating system 102 may comprise alternations to original operating system 103 to prevent cheating such as, for example, modifications to prevent cheating behavior by user 105.

Modified operating system 102 may create isolated execution environment 108 on client device 110. Isolated execution environment 108 may be a spectrum that runs from requiring all software be directly signed by a single vender to allowing a more flexible system which allows for third party software to become certified, by passing certain restricting requirements, and thereby be allowed to run in the isolated execution environment. According to one embodiment, a TPM may be a root of trust and isolated execution environment 108 may be established primarily through code measurements and unlocking of secrets if the code measures correctly.

Isolated execution environment 108 may comprise an environment in which the software running on client device 110 can be controlled and identified. In a fully isolated environment, an attacker cannot run any code on client device 110 and must resort to more costly and cumbersome hardware based attacks. External entity 104 may operate to verify in fact that isolated execution environment 108 is installed and intact on client device 110 by performing monitoring functions on client device 110 to verify that isolated execution environment 108 is operating, i.e., modified operating system 102 is installed and executing.

Referring again to FIG. 1a, user 105 may utilize client device 110 to play games such as game title 112 or run other entertainment software. User 105 may utilize client device 110 in both an online and offline mode. User 105 interacting with game title 112 in either an offline or online mode may garner achievement awards or other representations regarding game play. Achievement awards may be, for example, representations of a level obtained, number of enemies overcome, etc. In addition, user 105 may set various parameters of game title 112, which controls features of game title 112. Features may comprise various functions related to game play such as difficulty levels, etc.

During an online mode, user 105 may interact with other players (not shown in FIG. 1a) to allow multiplayer game play. In particular, client device 110 may be coupled to entertainment server 116 via network 114 in order to allow user 105 to interact with other users (not shown) in multiplayer game play. During a multiplayer game session, user 105 may enjoy various features related to operation of game title 112 that affect game play. These features may comprise the operations of the game such as whether the user's player is invisible or has certain invulnerabilities.

User 105 may also interact with client device 110 in an offline mode, for example, during single player game play. Subsequently, user 105 may cause client device 110 to go online. After this transition from an offline mode to an online mode, various achievements user 105 has garnered during offline game play may be represented to other players who are online.

According to one embodiment, a pre-existing or original environment, e.g., original operating system 103 may be replaced in client device 110, which upon replacement by modified operating system 102, may now support running of game title 112 but only in a restricted manner. Modified operating system 102 may be, for example, an operating system that hosts entertainment or gaming software but restricts user 105 from engaging in particular undesirable cheating behavior.

According to one embodiment, modified operating system 102 may be an operating system that creates a restricted environment with respect to running of game titles, e.g., 112. That is, modified operating system 102 may be engineered from original operating system 103 in such a way as to restrict the ability of user 105 from performing certain cheating behavior.

For example, original operating system 103 may allow for the installation of any device driver without restriction so long as the driver has been signed by a key which has been certified by one of several root certificate authorities. Modified operating system 102 may be modified to prevent certain types of cheating behavior by requiring any device drivers to be signed by a particular key of a centralized authority and may further prohibit updating of device drivers by a local administrator.

Trusted external entity 104, may perform functions with respect to client 110 to verify in fact that modified operating system 102 is in fact installed and executing on client device 110. Trusted external entity 104 may be trusted in the sense that its operations are trusted to a higher degree than the entity that trusted entity 104 is verifying, i.e., modified operating system 103. That is, the operations of trusted entity 104 are trusted to a much greater degree than the behavior of user 105 to have actually installed modified operating system 102.

Figure 1B:
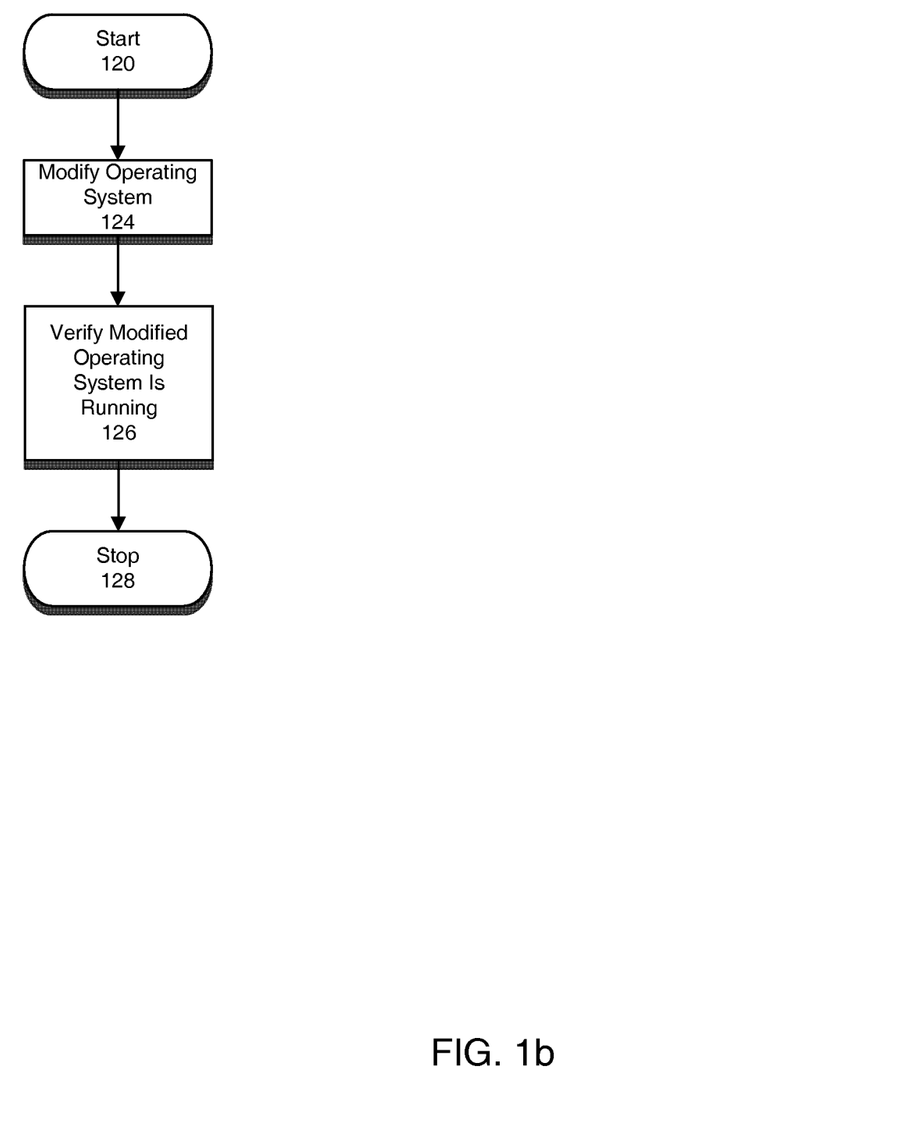
FIG. 1b is a flowchart depicting an operation of an anti-cheating process according to one embodiment.

FIG. 1b is a flowchart depicting an operation of an anti-cheating process according to one embodiment. The process is initiated in 120. In 124, an original operating system is modified to crate an isolated execution environment, which may be a restricted execution environment to preclude a user from engaging in various anti-cheating behavior. In 126, a trusted external entity performs a verification to determine whether the modified operating system is in fact running and installed on a particular client device. The process ends in 128.

Figure 2:
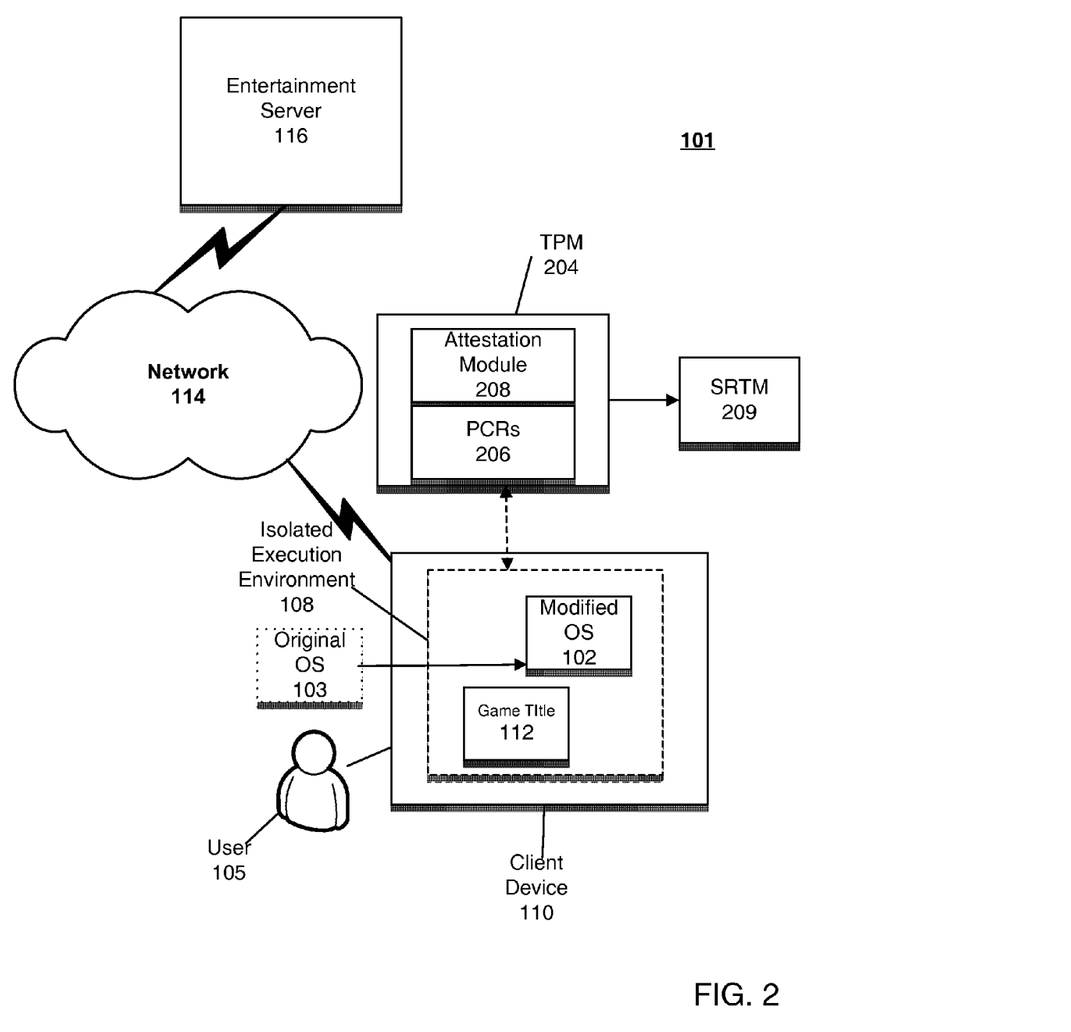
FIG. 2 is a block diagram of a trusted platform module and static root of trust module for performing an anti-cheating function.

FIG. 2 is a block diagram of a trusted platform module and static root of trust module for performing an anti-cheating function. In particular, as shown in FIG. 2, the functions of trusted external entity shown in FIG. 1a have been replaced by TPM 204. According to one embodiment, TPM 204 may perform an attestation function or operation.

In particular, TPM 204 may perform an attestation function via attestation module 208. Attestation may refer to a process of vouching for the accuracy of information, in particular the installation and execution of modified operating system 102 on client device 110. TPM 204 may attest, for example, to the boot environment and the specific boot chain which loaded on to the client device 110.

Attestation allows changes to the software running on the client device; however all such changes to that software are measured allowing an authorization decision to release secrets or to allow access to network functionality. Attestation may be achieved by having hardware associated with client device 102 generate a certificate stating what software is currently running, e.g., modified operating system 102. Client device 102 may then present this certificate to a remote party such as entertainment server 116 to show that its software, e.g., modified operating system 102, is in fact intact on client device 110 and has not been tampered with. Attestation may, although need not necessarily, be combined with encryption techniques, such as for example public-key encryption, so that the information sent can only be read by the programs that presented and requested the attestation, and not by an eavesdropper. Such encryption techniques can protect both the privacy of the user as well as the confidentiality of the protocol in use by the system.

According to one embodiment, attestation may be applied in the context of anti-cheating to determine whether a user is running a particular version of a system or operating system. That is, attestation may be performed by attestation module 208 on TPM 204 to verify that modified operating system 102 has been installed and is executing on client device 110. For example, it may be desirable to force user 105 to run modified operating system 102 rather than original operating system 103 as the modified version may have enhanced security and anti-cheating protection itself. That is, as described with respect to FIG. 1a, modified operating system 102 may comprise a restricted environment represented by isolated execution environment 108.

However, user 110 may attempt to engage in cheating behavior by pretending to run modified operating system 102 when in fact user 110 is in fact running an old version of the operating system, i.e., original operating system 103. This might be accomplished by gleaning certain bits from the new version (modified operating system 102) while in fact running the old version (original operating system 103), thereby falsely representing that user 105 is running the new version (modified operating system 102). Such techniques are common today, whereby after a patch is made to a breached DRM system, the attacker either obtains the new secret data from the patched system and places that data into the old breach system, falsely making the old breached system appear to be the new patched one, or by applying the same form, or slightly modified form, of attack on the new patched system creating a new breached system. In both cases the attacker is not running the newly patched DRM system. Increasing the difficulty of the attacker to perform either of those actions represents the majority of the work in releasing a patch. The developer must keep in mind the ease with which the new secrets can be extracted and the ease in which the same class of attack can be applied to the new patched system. Thus, it may be desirable to have TPM 204 attest to the fact that user 105 is running modified operating system 102 as opposed to either the original operating system 103, or a combination of both. Alternatively, the desired component may alternatively be a hardware component. In this case, it may be desirable for a trusted component to attest to the fact that a user has the particular hardware component. An additional alternative is for the hardware component to directly enforce restrictions on what software can run, preventing direct modification to the environment. A further alternative is for the hardware component to both enforce restrictions on what software can load and to measure and provide attestations of the software that did load. Likewise a hypervisor can perform both or either action.

TPM 204 may comprise a secure crypto processor (not shown in FIG. 2) that may store cryptographic keys that protect information. TPM 204 may provide facilities for the secure generation of cryptographic keys, and limitation of their use, in addition to a hardware pseudo-random number generator. Furthermore, as described, TPM 204 may also provide capabilities such as attestation and sealed storage. Attestation may be achieved by TPM 204 creating a nearly un-forgeable hash key summary of a hardware and software configuration, a hardware configuration alone or a software configuration alone such as the hardware and software configuration of client device 110 (e.g., system 102 and application 112). According to one embodiment, the un-forgeable hash key summary(s) may be stored in platform configuration registers ("PCRs") 206.

A third party such as entertainment server 116 may then verify that the software such as modified operating system 204 is intact on client device 110 and has not been changed, using that attestation, for example as described with respect to FIG. 1a. TPM 204 may then perform a sealing process, which encrypts data in such a way that it may be decrypted only if TPM 204 releases the associated decryption key, which it only does for software which has the correct identity as measured into the PCRs of TPM 204. By specifying during the sealing process which software may unseal the secrets, the entertainment server can allow off-line use of those secrets and still maintain the protections.

While SRTM 209 provides strong measurement, it may become cumbersome when dealing with the number of individual binaries in a modern operating system. In order to address this issue, TPM 204 may perform measurement up to a pre-determined point where the security and integrity of the remainder of the system may be managed through another mechanism such as using a code integrity and disk integrity or other integrity based mechanism (described below).

Figure 3A:
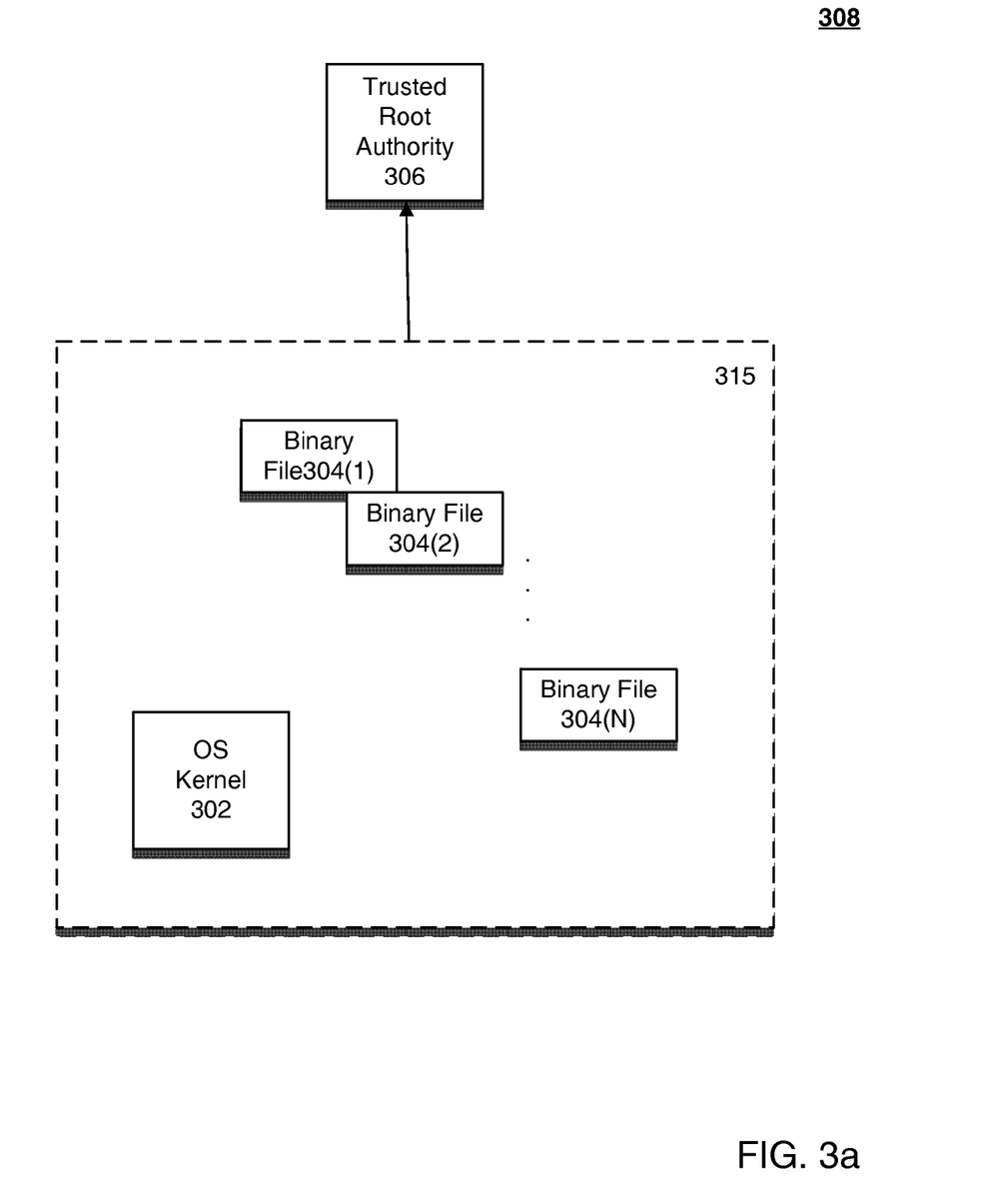
FIG. 3a depicts a code integrity operation according to one embodiment.

FIG. 3a depicts a code integrity operation according to one embodiment. Code integrity may require that any binary loaded be cryptographically signed by a trusted root authority. Thus, as depicted in FIG. 3a, binary files 304(1)-304(N) as well as OS kernel 302 are cryptographically signed, i.e., exist in cryptographically secure environment 315. In order for various files 304(1)-304(N) and 302 to be utilized they must be verified by trusted root authority 306.

For example, some operating systems may include a code integrity mechanism for kernel mode components. According to one embodiment, this existing mechanism may be leveraged by measuring the responsible component (and the contents of the boot path up to that point) and then inferring the security of the operating system kernel. According to one embodiment, the binary signature may be rooted to a new key to limit the set of drivers that can load. In addition, an extension may be grafted onto this system to require that user mode binaries possess the same signatures. The use of code integrity may nevertheless still leave a set of non-binary files that are essential to security such as the registry or other configuration files.

Figure 3B:
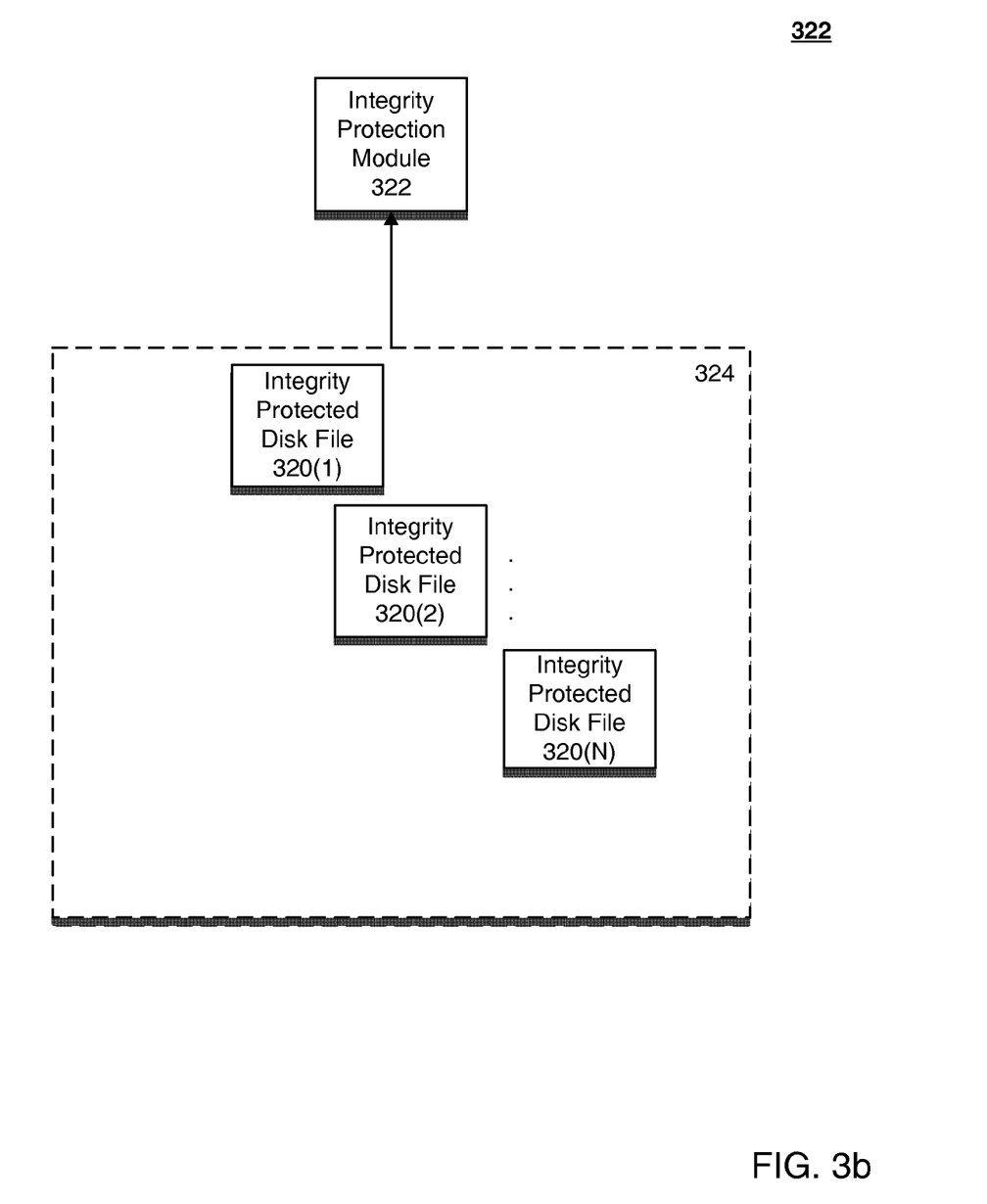
FIG. 3b depicts an operation of a disk integrity mechanism according to one embodiment.

According to one embodiment, a disk integrity mechanism may provide a method to patch those remaining holes. FIG. 3b depicts an operation of a disk integrity mechanism according to one embodiment. Disk integrity may attempt to ensure an isolated execution environment through control of the persisted media, such as the hard disk. Thus, as depicted in FIG. 3b, integrity protected disk files 320(1)-320(N) in environment 324 are integrity checked using module 322 before they can be utilized. By assuring that data read from the disk is cryptographically protected (e.g. digitally signed), the difficulty of injecting attacking software into the system may be elevated, thus making it particularly difficult to persist an attack once it is established.

According to the disk integrity model, files on a partition, e.g., 320(1)-320(N), may be signed by a root key. This may require that the disk be effectively read-only (since files cannot be signed on the client). The disk integrity model may address a vulnerability of code integrity by ensuring that the data is signed as well as the code.

According to an alternative embodiment, a proxy execution mechanism may be employed. Proxy execution may refer to running code somewhere other than the main central processing unit ("CPU"). For example, code may be run on a security processor, which may be more tamper and snooping resistant than the main CPU. In this manner, the hardware may be leveraged by moving the execution of certain parts of the code to a security processor in various ways.

Figure 4A:
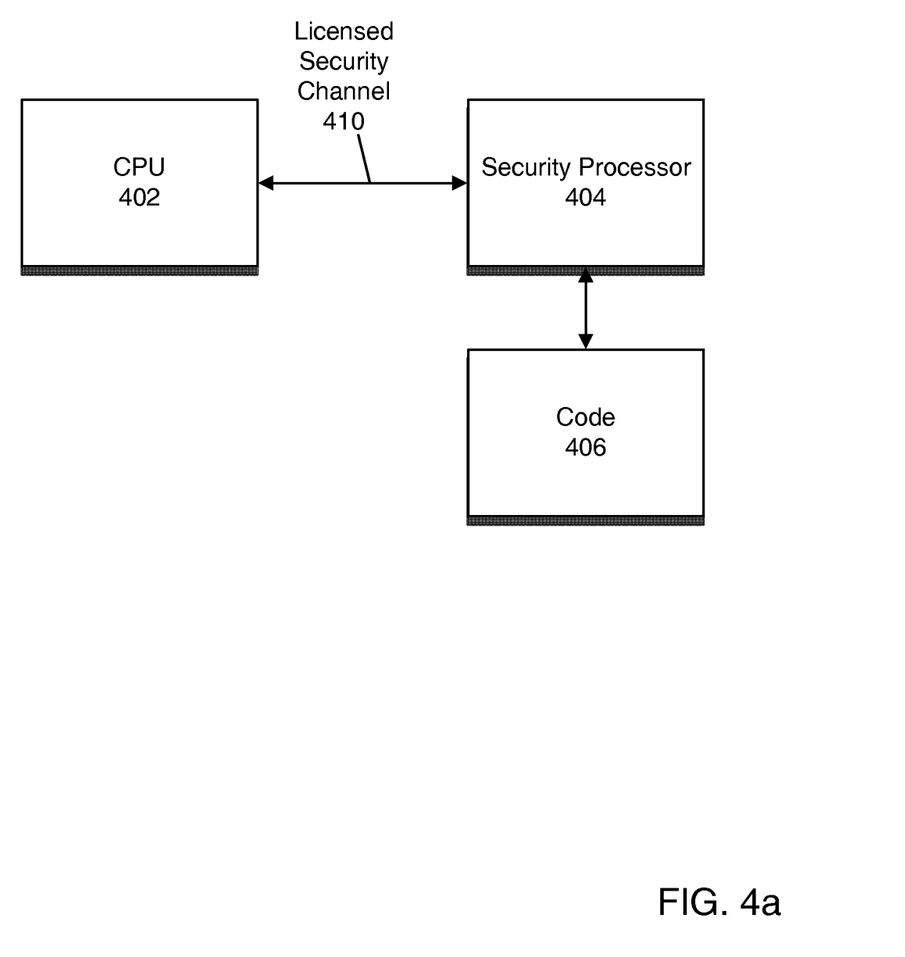
FIG. 4a depicts a proxy execution process according to one embodiment.

According to one embodiment, proxy execution may be further strengthened by requiring that the channel between the CPU and the security processor be licensed. In particular, FIG. 4a depicts a proxy execution process according to one embodiment. Code 406 may be executed on security processor 404. Security processor 404 may communicate with CPU 402 via licensed channel 410.

According to one embodiment, a proxy execution mechanism may be used to tie the security processor to a particular SRTM code measurement and, if the license expires periodically, can be used to force rechecks of the system as a form of recovery. According to this embodiment, all communication between the security processor and the CPU (other than the communication needed to establish a channel) may require knowledge of a session key. To establish this, the security processor may either directly check the attestation from the TPM if it has that capability or if it doesn't or if more flexibility of versioning is required, a trusted third party, such as an entertainment server 116, can be used to negotiate between the TPM and the Security Processor, whereby the entertainment server checks the attestation from the TPM and then provides proofs and key material to allow for establishment of a cryptographically protected channel between the security processor and the TPM. The TPM can then provide those secrets to the CPU on subsequent reboots of the device in the same way the TPM protects all secrets to authorized PCR values.

According to an alternative embodiment, an individualization mechanism may also be employed. Individualization may refer to a process of building and delivering code that is bound to a single machine or user. For example, necessary code for the operation of the applications may be built (either on-demand or in advance and pooled) on a server and downloaded to the client as part of an activation process.

According to one embodiment, individualization may attempt to mitigate "Break Once Run Everywhere" breaches by making the attacker perform substantial work for each machine on which he desires to use the pirated content. Since the binaries produced by the individualization process are unique (or at least "mostly unique"), it becomes more difficult to distribute a simple patcher that can compromise all machines.

Individualization may require some form of strong identity—for a machine binding, this would be a hardware identifier. In traditional DRM systems this has been derived by combining the IDs of various pieces of hardware in the system. According to one embodiment, the security processor may be leveraged to provide a unique and strong hardware identifier.

In certain systems such as those with a poor isolation environment, a method for detecting cheating (and, to a lesser degree, piracy) may employ a watchdog process, which may respond to challenges from game server 116. The data collected by game server 116 may later be used to determine if a machine has been compromised, and if so the machine can be banned from gaming server 116 and prevented from acquiring additional licenses for content.

In one embodiment the watchdog process may itself be integrity protected by the same mechanisms which protect the operating system or execution environment as described in previous embodiments above.

Figure 4B:
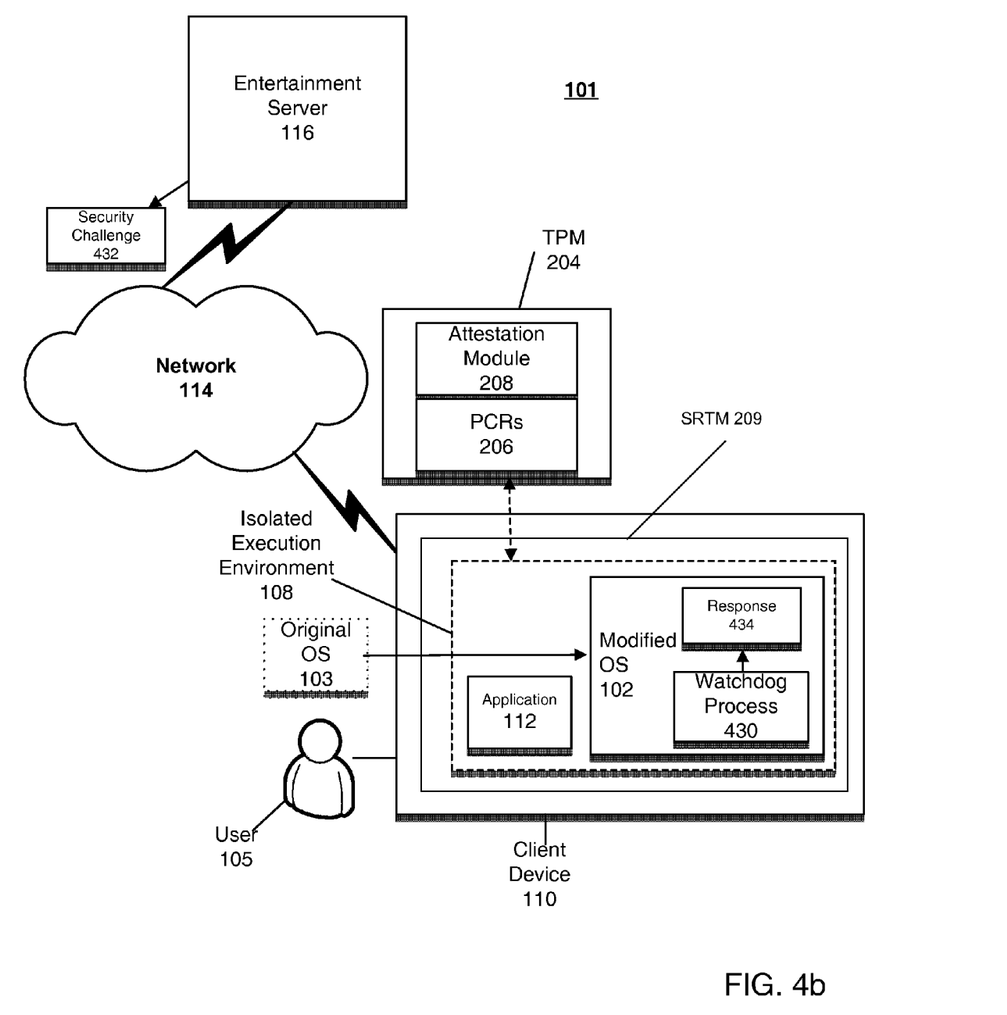
FIG. 4b depicts an operation of a watchdog process according to one embodiment.

FIG. 4b depicts an operation of a watchdog process according to one embodiment. As depicted in FIG. 4b, anti-cheating system 101 has further been adapted to include watchdog process 430 on client device 110. Entertainment server 116 may generate security challenge 432, which is transmitted over network 114, and received by watchdog process 430. Watchdog process 430 in turn may generate response 434, which it may then transmit over network 14 to entertainment server 116. In addition to executing within modified operating system 102, watchdog process 430 may also execute in a hypervisor.

Implementation of watchdog process 430 may require enforcement of several criteria. First, it should not be easy to trivially create a codebook of responses for these challenges, which means that the set of challenges should be large and the correct answers must not be obviously available to the client. Watchdog process 430 may require sufficient agility such that new challenges can be added at will. In the worst case, an attacker could set up a clean system on the Internet somewhere, such that client's systems running attack software could use it as an oracle. To prevent this, encryption may be applied to the channel between the gaming server 116 and watchdog process 430 (to prevent trivial snooping and man in the middle attacks), and potentially responses may be tied in to a security processor, machine identity, or other security hardware, such as a TPM, in some way.

A layered protection scheme may also be employed, wherein multiple technologies are layered in various combinations. For example, a "dual boot" solution may be employed that makes use of a reduced attack footprint, disk integrity and SRTM.

Figure 4C:
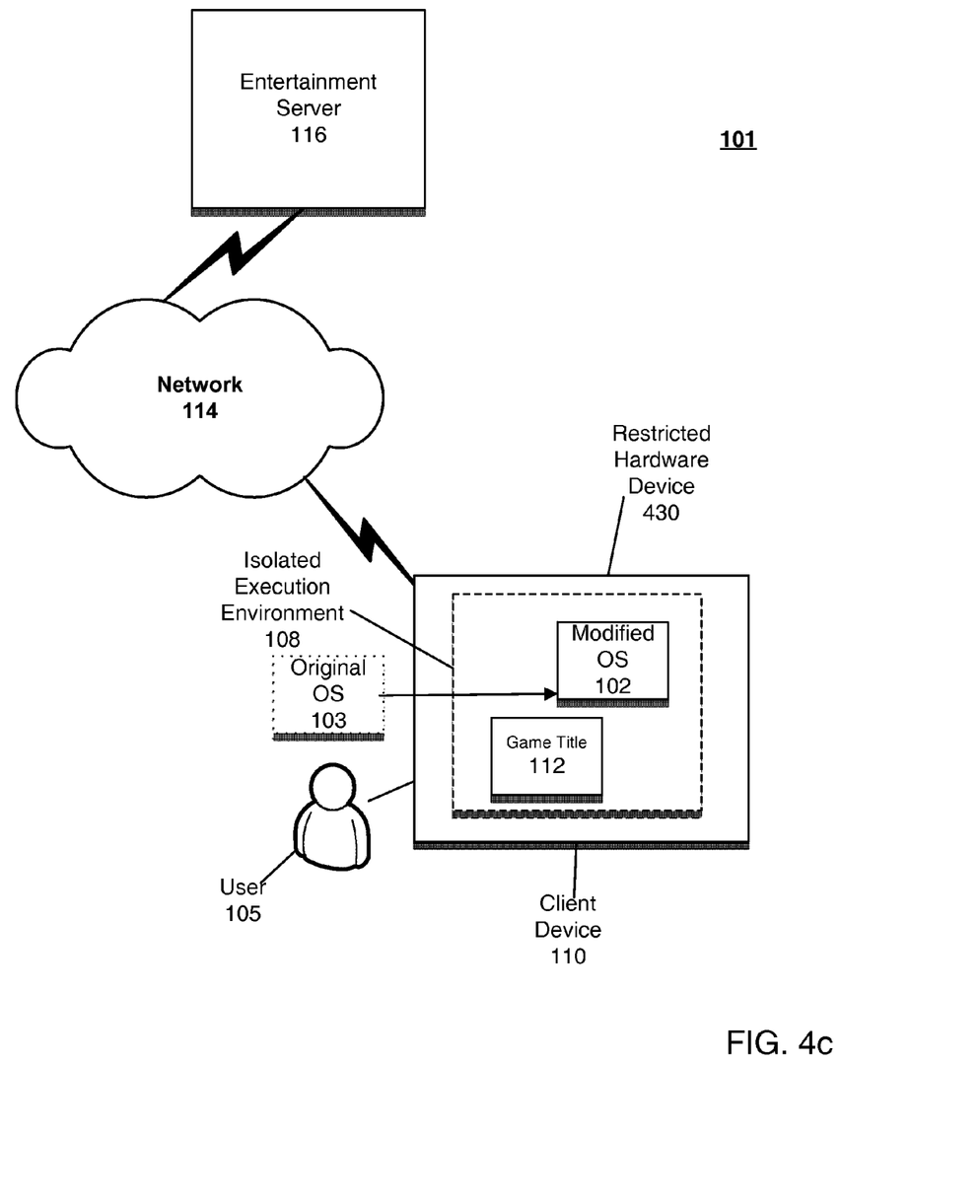
FIG. 4c, depicts an anti-cheating system is implemented via a restricted hardware device.

According to an alternative embodiment, rather than utilize trusted external entity 104 as shown in FIG. 1a, which may be a TPM as described previously, trusted entity may comprise the very hardware device upon which modified operating system 102 is hosted so long as that hardware device can enforce that modified operating system 102 is in fact running on it. Thus, as shown in FIG. 4c, anti-cheating system 101 is implemented via restricted hardware device 430, which internally can enforce the operation and execution of a desired operating system such as modified operating system 102. Restricted hardware device 430 may be, for example, a cellular telephone or a cable set top box.

Figure 4D:
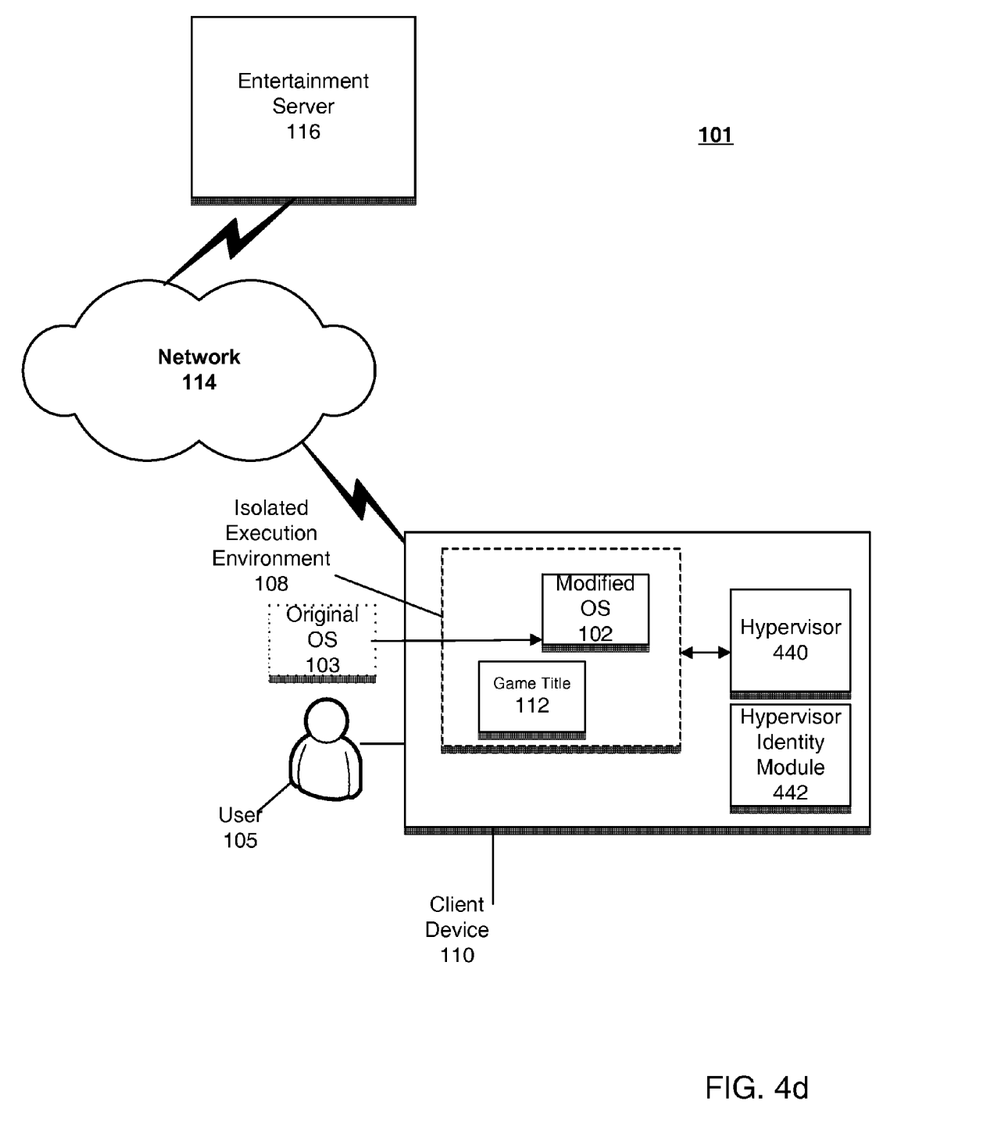
FIG. 4d depicts an operation of an anti-cheating system via a hypervisor according to one embodiment.

According to yet another alternative embodiment, rather than employing trusted external entity 104, hypervisor 440 may be provided internally to client device 110. FIG. 4d depicts an operation of an anti-cheating system via a hypervisor according to one embodiment. Hypervisor 440 may receive the burden of measurement instead of employing SRTM in a TPM environment as described previously. According to one embodiment, hypervisor 440 may be a measured boot hypervisor. According to this embodiment, a mechanism may be provided to determine an identity of a particular hypervisor 440 that is running, e.g., via hypervisor identity module 442. Thus, for example, entertainment server 116 may communicate with hypervisor identity module to identify the nature of hypervisor 440. Hypervisor 440 in turn may communicate with entertainment server 116 to inform entertainment server 116 of the existence or non-existence of modified operating system 102. The installation of modified operating system 102 ensures a non-cheating context to operation of game title 112.

Figure 5:
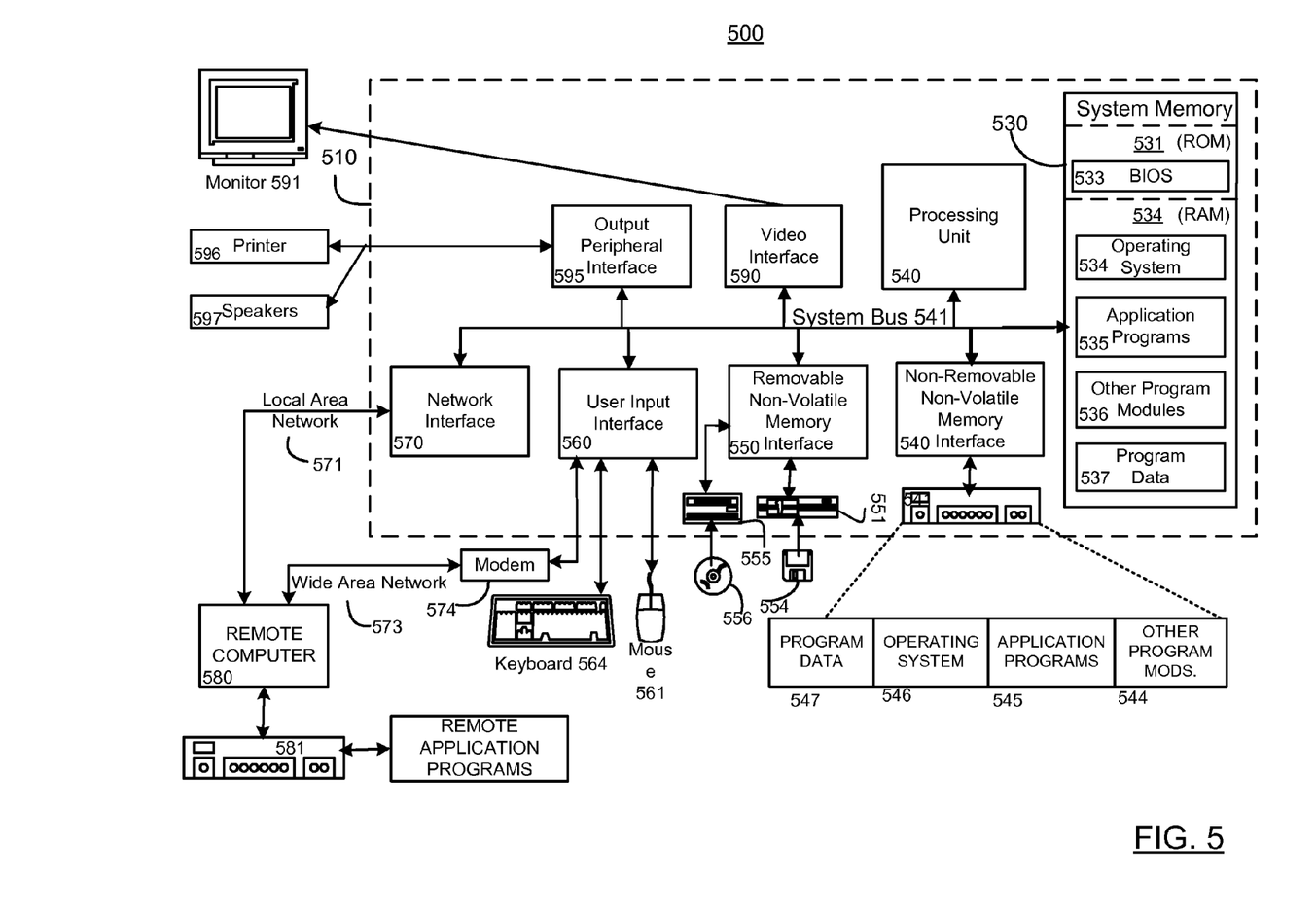
FIG. 5 shows an exemplary system for implementing the example embodiments including a general purpose computing device in the form of a computer.

FIG. 5 shows an exemplary computing environment in which aspects of the example embodiments may be implemented. Computing system environment 500 is only one example of a suitable computing environment and is not intended to suggest any limitation as to the scope of use or functionality of the described example embodiments. Neither should computing environment 500 be interpreted as having any dependency or requirement relating to any one or combination of components illustrated in exemplary computing environment 500.

The example embodiments are operational with numerous other general purpose or special purpose computing system environments or configurations. Examples of well known computing systems, environments, and/or configurations that may be suitable for use with the example embodiments include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

The example embodiments may be described in the general context of computer-executable instructions, such as program modules, being executed by a computer. Generally, program modules include routines, programs, objects, components, data structures, etc. that perform particular tasks or implement particular abstract data types. The example embodiments also may be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 5, an exemplary system for implementing the example embodiments includes a general purpose computing device in the form of a computer 510. Components of computer 510 may include, but are not limited to, a processing unit 520, a system memory 530, and a system bus 521 that couples various system components including the system memory to processing unit 520. Processing unit 520 may represent multiple logical processing units such as those supported on a multi-threaded processor. System bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). System bus 521 may also be implemented as a point-to-point connection, switching fabric, or the like, among the communicating devices.

Computer 510 typically includes a variety of computer readable media. Computer readable media can be any available media that can be accessed by computer 510 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 510. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

System memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536, and program data 537.

Computer 510 may also include other removable/non-removable, volatile/nonvolatile computer storage media. By way of example only, FIG. 5 illustrates a hard disk drive 540 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. Hard disk drive 541 is typically connected to system bus 521 through a non-removable memory interface such as interface 540, and magnetic disk drive 551 and optical disk drive 555 are typically connected to system bus 521 by a removable memory interface, such as interface 550.

The drives and their associated computer storage media discussed above and illustrated in FIG. 5, provide storage of computer readable instructions, data structures, program modules and other data for computer 510. In FIG. 5, for example, hard disk drive 541 is illustrated as storing operating system 544, application programs 545, other program modules 546, and program data 547. Note that these components can either be the same as or different from operating system 534, application programs 535, other program modules 536, and program data 537. Operating system 544, application programs 545, other program modules 546, and program data 547 are given different numbers here to illustrate that, at a minimum, they are different copies. A user may enter commands and information into computer 510 through input devices such as a keyboard 562 and pointing device 561, commonly referred to as a mouse, trackball or touch pad. Other input devices (not shown) may include a microphone, joystick, game pad, satellite dish, scanner, or the like. These and other input devices are often connected to processing unit 520 through a user input interface 560 that is coupled to the system bus, but may be connected by other interface and bus structures, such as a parallel port, game port or a universal serial bus (USB). A monitor 591 or other type of display device is also connected to system bus 521 via an interface, such as a video interface 590. In addition to the monitor, computers may also include other peripheral output devices such as speakers 597 and printer 596, which may be connected through an output peripheral interface 595.

Computer 510 may operate in a networked environment using logical connections to one or more remote computers, such as a remote computer 580. Remote computer 580 may be a personal computer, a server, a router, a network PC, a peer device or other common network node, and typically includes many or all of the elements described above relative to computer 510, although only a memory storage device 581 has been illustrated in FIG. 5. The logical connections depicted in FIG. 5 include a local area network (LAN) 571 and a wide area network (WAN) 573, but may also include other networks. Such networking environments are commonplace in offices, enterprise-wide computer networks, intranets and the Internet.

When used in a LAN networking environment, computer 510 is connected to LAN 571 through a network interface or adapter 570. When used in a WAN networking environment, computer 510 typically includes a modem 572 or other means for establishing communications over WAN 573, such as the Internet. Modem 572, which may be internal or external, may be connected to system bus 521 via user input interface 560, or other appropriate mechanism. In a networked environment, program modules depicted relative to computer 510, or portions thereof, may be stored in the remote memory storage device. By way of example, and not limitation, FIG. 5 illustrates remote application programs 585 as residing on memory device 581. It will be appreciated that the network connections shown are exemplary and other means of establishing a communications link between the computers may be used.

Computing environment 500 typically includes at least some form of computer readable media. Computer readable media can be any available media that can be accessed by computing environment 500. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing environment 500. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Although the subject matter has been described in language specific to the structural features and/or methodological acts, it is to be understood that the subject matter defined in the appended claims is not necessarily limited to the specific features or acts described above. Rather, the specific features or acts described above are disclosed as example forms of implementing the claims.

The inventive subject matter is described with specificity to meet statutory requirements. However, the description itself is not intended to limit the scope of this patent. Rather, it is contemplated that the claimed subject matter might also be embodied in other ways, to include different steps or combinations of steps similar to the ones described in this document, in conjunction with other present or future technologies.

What is claimed:

1. A method for preventing cheating comprising:
   monitoring, by a trusted component, a device and a modified operating system executing on the device;
   performing a proxy execution operation that includes execution of code on a tamper resistant security processor, wherein the proxy execution operation utilizes a licensed channel between the tamper resistant security processor and a central processing unit of the device, the trusted component usable to check the licensed channel's attestation, and an associated static root of trust measurement usable to validate that the modified operating system is running in an untampered form, and wherein the tamper resistant security processor is associated with a particular static root of trust measurement usable to cause a recovery check when the licensed channel expires; and
   restricting access to resources based on results of the monitoring and the performing of the proxy execution operation.

2. The method of claim 1, wherein the resources are necessary secrets.

3. The method of claim 1, wherein the resources are network services.

4. The method of claim 1, wherein the resources are additional hardware.

5. The method of claim 1, wherein the trusted component is a trusted platform module.

6. The method of claim 5, wherein the trusted platform module combined with software running on the device generate a static root of trust measurement.

7. The method of claim 6, further comprising performing a code integrity operation.

8. The method of claim 7, further comprising performing a disk integrity operation.

9. The method of claim 1, wherein a first operating system executing on the device is modified to provide the modified operating system.

10. The method of claim 7, further comprising performing an individualization mechanism.

11. The method of claim 1, further comprising performing a watchdog operation.

12. A computer readable storage device comprising instructions for preventing cheating, the instructions for performing operations comprising:
   monitoring, by a trusted component, a device and a modified operating system executing on the device;
   performing a proxy execution operation that includes execution of code on a tamper resistant security processor, wherein the proxy execution operation utilizes a licensed channel between the tamper resistant security processor and a central processing unit of the device, the trusted component usable to check the licensed channel's attestation, and an associated static root of trust measurement usable to validate that the modified operating system is running in an untampered form, and wherein the tamper resistant security processor is associated with a particular static root of trust measurement usable to cause a recovery check when the licensed channel expires; and restricting access to resources based on results of the monitoring and the performing of the proxy execution operation.

13. The computer readable storage device of claim 12, wherein the resources are necessary secrets.

14. The computer readable storage device of claim 12, wherein the resources are network services.

15. The computer readable storage device of claim 12, wherein the resources are additional hardware.

16. The computer readable storage device of claim 12, wherein a first operating system executing on the device is modified to provide the modified operating system.

17. A system for preventing cheating comprising:
a device;
a modified operating system executing on the device,
a tamper resistant security processor;
a memory storing computer-executable instructions that, when executed, cause the system to perform operations comprising:
instantiate a licensed channel operable to perform a proxy execution operation that includes execution of code on the tamper resistant security processor, wherein the licensed channel is between the tamper resistant security processor and a central processing unit of the device, and including a trusted component usable to check the licensed channel's attestation and an associated static root of trust measurement usable to validate that the modified operating system is running in an untampered form, and wherein the tamper resistant security processor is associated with a particular static root of trust measurement usable to perform a recovery check when the licensed channel expires;
monitor the device and the modified operating system; and
restrict access to resources based on results of the monitoring and performing of the proxy execution operation.

18. The system of claim 17, wherein the resources are necessary secrets.

19. The system of claim 17, wherein the resources are network services.

20. The system of claim 17, wherein the resources are additional hardware.

21. The system of claim 17, wherein a first operating system executing on the device is modified to provide the modified operating system.

* * * * *